US012737702B2

(12) United States Patent
Chen et al.

(10) Patent No.: US 12,737,702 B2
(45) Date of Patent: Sep. 15, 2026

(54) SYSTEM AND METHOD FOR PROVIDING ADAPTIVE PRESCRIPTIVE ANALYTICS FOR RECOMMENDATION ENGINES USING MULTI-LAYER CORRELATION AND DATA ANALYTICS

(71) Applicants: ProphetStor Data Services, Inc., Taichung (TW); Wise Creation International Limited, Tortola (VG)

(72) Inventors: Wen-Shyen Chen, Taichung (TW); Ken Huang, Boston, MA (US)

(73) Assignees: ProphetStor Data Services, Inc., Taichung (TW); Wise Creation International Limited, Tortola (VG)

( * ) Notice: Subject to any disclaimer, the term of this patent is extended or adjusted under 35 U.S.C. 154(b) by 410 days.

(21) Appl. No.: 18/121,066

(22) Filed: Mar. 14, 2023

(65) Prior Publication Data

US 2024/0311718 A1 Sep. 19, 2024

(51) Int. Cl.
*G06Q 10/0631* (2023.01)
*G06F 9/50* (2006.01)

(52) U.S. Cl.
CPC ....... *G06Q 10/06315* (2013.01); *G06F 9/505* (2013.01); *G06F 9/5011* (2013.01)

(58) Field of Classification Search
CPC ....... G06F 9/5011; G06F 9/505; G06N 20/00; G06N 3/04; G06N 3/08; G06N 5/022; G06N 5/04; G06N 5/043; G06Q 10/04; G06Q 10/0631; G06Q 10/06315; G06Q 10/0635; G06Q 10/0637; G06Q 10/06375; G06Q 10/067; G06Q 10/10; G06Q 30/018; H04L 41/082; H04L 41/0833; H04L 41/145; H04L 41/16; H04L 41/5003; H04L 41/5009; H04L 41/5019; H04L 41/5096; H04L 43/20; H04L 67/10; H04L 67/1097;
(Continued)

(56) References Cited

U.S. PATENT DOCUMENTS 11,550,635 B1 * 1/2023 Wong .................... G06F 9/5022
2011/0145657 A1 * 6/2011 Bishop ................ H04L 63/1433
714/47.1

(Continued)

*Primary Examiner* — Christopher Biagini
(74) *Attorney, Agent, or Firm* — Damian K. Jackson; Jackson IPG PLLC

(57) ABSTRACT

A system and a method for providing adaptive prescriptive analytics using multi-layer correlation and data analytics are disclosed. A recommendation engine in the system is adaptive regarding resource usage with the aid of multi-layer correlation and data analytics. The system includes a resource orchestrator, which utilizes operation metadata analytics to analyze data from multiple layers of IT infrastructure, including application data, server data, and cloud instance data, uses multi-layer correlation and causality analytics to identify patterns and trends in workload operation metadata, and generates resource orchestration based on this analysis, thereby achieving efficient operations. In addition, the system also includes an adaptive scaling module, which can scale specific modules of the recommendation engine based on the volume of data being processed. This allows the recommendation engine to maintain high levels of efficiency and accuracy without wasting resources.

8 Claims, 6 Drawing Sheets

(58) Field of Classification Search
CPC ....... H04L 67/12; H04L 67/53; H04L 67/565; H04L 69/40
See application file for complete search history.

(56) References Cited

U.S. PATENT DOCUMENTS

| | | | | |
|---|---|---|---|---|
| 2012/0239739 | A1* | 9/2012 | Manglik | G06F 8/61 709/203 |
| 2017/0178027 | A1* | 6/2017 | Duggan | G06F 9/543 |
| 2019/0229992 | A1* | 7/2019 | Margoor | H04L 67/1097 |
| 2020/0007460 | A1* | 1/2020 | Guim Bernat | G06F 9/5072 |
| 2020/0380351 | A1* | 12/2020 | Verma | G06N 3/08 |
| 2022/0398516 | A1* | 12/2022 | Goswami | G06Q 10/04 |
| 2023/0185608 | A1* | 6/2023 | Poort | H04L 41/5009 709/224 |
| 2023/0309164 | A1* | 9/2023 | Xu | H04W 28/26 |
| 2023/0350717 | A1* | 11/2023 | Neate | G06F 9/5027 |
| 2024/0184638 | A1* | 6/2024 | Kairali | G06F 9/5072 |

* cited by examiner

| Datasets | | Azure 2019 | | | Alibaba 2021 | | |
|---|---|---|---|---|---|---|---|
| Exp | Metrics | Facebook Prophet | LinkedIn Greykite | **Present Invention** | Facebook Prophet | LinkedIn Greykite | **Present Invention** |
| Exp1-High Corr | Avg. MAPE (%) (the lower, the better) | 264 | 210 | 34 | 17 | 9 | 12 |
| | Avg. Runtime (s) (the lower, the better) | 2.0 | 15 | 0.8 | 2.2 | 16 | 0.7 |
| | **Performance Advantage** | 2.5X | 18.75X | | 3.14X | 22.86X | |
| Exp2-Low Corr | Avg. MAPE (%) (the lower, the better) | 985 | 1014 | 47 | 346 | 190 | 45 |
| | Avg. Runtime (s) (the lower, the better) | 2.1 | 14 | 2.2 | 2.1 | 16 | 1.8 |
| | **Performance Advantage** | N/A | 6.36X | | 1.16X | 8.89X | |

Fig. 4

SYSTEM AND METHOD FOR PROVIDING ADAPTIVE PRESCRIPTIVE ANALYTICS FOR RECOMMENDATION ENGINES USING MULTI-LAYER CORRELATION AND DATA ANALYTICS

FIELD OF THE INVENTION

The present invention relates to a data processing technology. More specifically, the present invention relates to a system and a method for providing adaptive prescriptive analytics for recommendation engines using multi-layer correlation and data analytics.

BACKGROUND OF THE INVENTION

At present, with the increasing complexity and scale of IT infrastructure, it is necessary to develop a variety of tools and solutions to manage and optimize the operation of complex systems, such as systems having cloud computing, local computing, and edge computing. An existing solution is to use a recommendation engine, which can analyze data from various layers of the IT infrastructure and generate optimization recommendations. However, conventional recommendation engines cannot effectively handle a large amount of data during operation, resulting in low processing efficiency and waste of system resources.

Nowadays, a variety of existing technologies related to adaptive resource allocation have emerged to solve this problem. For example, U.S. Pat. No. 8,301,772, titled "Method and apparatus for allocating resources among backup tasks in a data backup system" to Veritas Technologies LLC, discloses a method and apparatus for allocating resources among backup tasks in a computer network. Estimated resource utilization is established for each of the backup tasks based on a set of backup statistics. A resource reservation is allocated for each of the backup tasks based on the estimated resource utilization thereof. The resource reservation of each of the backup tasks is then dynamically changed during the performance thereof. Furthermore, U.S. Pat. No. 10,333,863, titled "Adaptive resource allocation based upon observed historical usage" to Delphix Corp, also discloses a method for allocating a network resource used by a plurality of consumers based upon a total throughput of the network resource.

However, the prior art recommendation engines for allocating resources generally focus on single-layer data analytics and making recommendations based on past data and user behaviors rather than adapting to changing data volumes and user behaviors in real-time. Moreover, the prior arts focus on improving recommendation accuracy rather than resource optimization. In actual implementation, different workloads will lead to different scaling of different components of the entire application, while the prior arts can only scale the entire system without the ability to selectively scale specific components. Therefore, there is an urgent need for an adaptive prescriptive analytics system to make recommendations more effective in terms of resource usage without affecting its performance.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to overcome the problems mentioned above, an object of the present invention is to provide a system and a method for providing adaptive prescriptive analytics using multi-layer correlation and data analytics, such that a recommendation engine has adaptiveness in terms of resource usage. The system includes a resource orchestrator, which utilizes operation metadata analytics to analyze data from multiple layers of IT infrastructure, including application data, server data, and cloud instance data, uses multi-layer correlation and causality analytics to identify patterns and trends in workload operation metadata, and generates resource orchestration based on this analysis, thereby achieving efficient operations. In addition, the system also includes an adaptive scaling module, which can scale specific modules of the recommendation engine based on the volume of data being processed. This allows the recommendation engine to maintain high levels of efficiency and accuracy without wasting resources.

To achieve the above object, the present invention provides a system for providing adaptive prescriptive analytics using multi-layer correlation and data analytics, comprising: a recommendation engine configured on microservices for analyzing data from various sources, including monitoring solutions, service mesh, and data mesh; a multi-layer correlation analysis module, connected with said recommendation engine, for obtaining dynamics of the data; a recommendation module, connected with said recommendation engine and said multi-layer correlation analysis module, for making recommendations for optimization based on the analyzed data; and an adaptive scaling module, connected with said recommendation engine, for adaptively scaling certain modules of said recommendation engine based on the volume of data being processed.

In one aspect of the present invention, the multi-layer correlation analysis module uses multi-layer correlation and data analytics to analyze data and correlations between different layers of the system, and to identify which parts of the recommendation engine needed to be scaled up in response to increased data volume.

In another aspect of the present invention, the data from various sources to be analyzed by the multi-layer correlation analysis module include application data, server data, and cloud instance data.

In yet another aspect of the present invention, the system further comprises a user interface, connected with the recommendation engine, for providing recommendations to a user for optimization implementation.

To achieve the above object, the present invention also provides a method for providing adaptive prescriptive analytics using multi-layer correlation and data analytics, comprising the steps of: a) collecting and analyzing data from various sources within a system, including workload data, resource utilization data, and performance data; b) using multi-layer correlation and prescriptive analytics to obtain data dynamics and identify bottlenecks and inefficiencies in the system; c) generating recommendations by a recommendation engine for resource allocation based on the analyzed data, including scaling or resizing resources to meet demand; d) implementing the recommendations in real-time, and adapting the recommendation engine as needed to optimize resource allocation and minimize waste; e) continuously monitoring and analyzing data to continually optimize resource allocation and improve efficiency of the system; and f) providing a user interface for visualizing and managing processes of resource allocation.

In one aspect of the present invention, step b) comprises sub-steps of: b1) obtaining resource prediction data at a future time point based on workload data and resource utilization data through system resource demand prediction and resource management model established by the multi-layer correlation; and b2) identifying the bottlenecks and inefficiencies in the system based on the resource prediction data, workload data, resource utilization data, and performance data through data dynamics by the prescriptive analytics.

In another aspect of the present invention, step d) comprises providing a user with recommendations for implementing optimization.

In yet aspect of the present invention, step f) comprises overriding or modifying recommendations as needed by means of the user interface.

In comparison with the prior arts, the system and method for providing adaptive prescriptive analytics using multi-layer correlation and data analytics, according to the present invention, provide proactive and prescriptive analytics for optimizing operations. Besides, the recommendation engine uses multi-layer correlation and data analytics to obtain dynamics and relationships between different layers of an IT infrastructure. Thus, adaptiveness is achieved, and resources are used efficiently and effectively.

BRIEF DESCRIPTION OF THE DRAWINGS

FIG. 4 shows a table illustrating the performance advantages of the present invention in comparison with Facebook Prophet and LinkedIn Greykite under the standard Azure 2019 and Alibaba 2021, where MAPE stands for Mean Average Percentage Error.

DETAILED DESCRIPTION OF THE PREFERRED EMBODIMENTS

The technical solutions in the embodiments of the present invention will be clearly and completely described concerning the drawings in the embodiments of the present invention. The described embodiments are only a part of the embodiments of the present invention, but not all the embodiments. Based on the embodiments of the present invention, all other embodiments obtained by those skilled in the art without any creative labor belong to the protection scope of the present invention.

Figure 1:
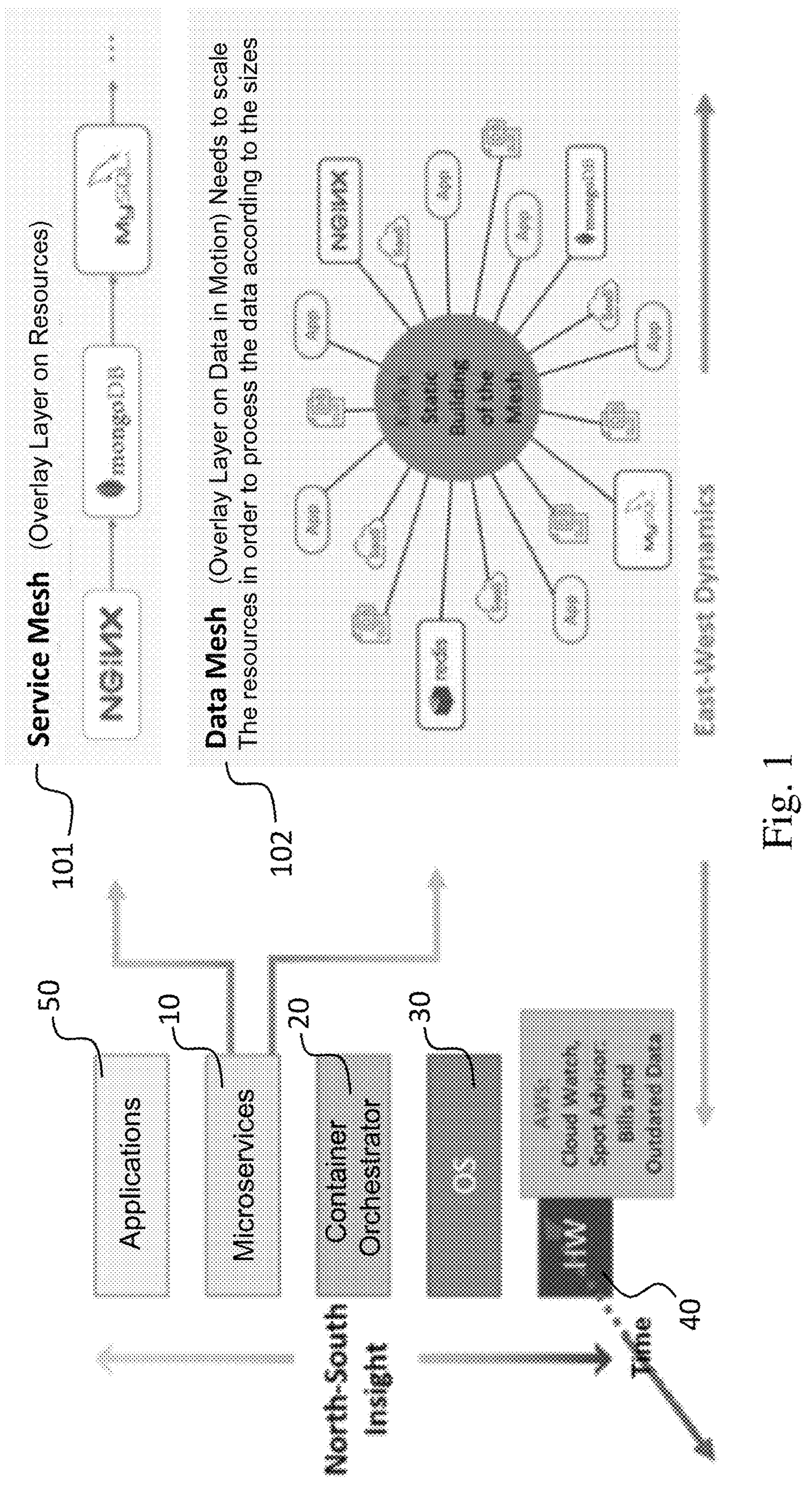
FIG. 1 is a schematic view illustrating a system and its components according to an embodiment of the present invention.

FIG. 1 is a schematic view illustrating a system and its components according to an embodiment of the present invention. As shown, the present invention discloses a system for providing adaptive prescriptive analytics using multi-layer correlation and data analytics. The system comprises a recommendation engine configured on microservices (also known as microservice architecture) 10 for analyzing data from various sources, including monitoring solutions (not shown), service mesh 101, and data mesh 102.

In this embodiment, while the microservices 10 are deployed on a container orchestrator 20, the microservices 10 can be deployed on, for example, Kubernetes (also known as K8s). Kubernetes is an open-source application for managing containerization on multiple hosts in a cloud platform, and it is a container orchestration engine open-sourced by Google. Furthermore, the container orchestrator 20 can be configured on a hardware (HW) device 40 on which an operating system (OS) 30 has been built, such as a server or a server cluster that can be x86, RISC, ARM, etc. Multiple applications 50 can be installed on microservices 10 for specified software requirements. The architecture of the system, according to this embodiment, is not limited to the North-South Insight (Numerals 40→30→20→10→50), as shown in FIG. 1. The order can be adjusted as needed.

In this embodiment, the service mesh 101 serves as an overlay layer on resources. The service mesh 101 is a cluster including multiple servers, which may include, for example, Nginx server (a high-performance HTTP and reverse proxy web server), MongoDB (a distributed document-oriented database) server, MySQL (a relational database management system) server and other service resources.

In this embodiment, the data mesh 102 serves as an overlay layer on data in motion, which includes data from multiple layers of the IT infrastructure, i.e., data from the application layer, such as data from various applications (marked by multiple Apps in FIG. 1); data from servers or server clusters, such as data from various servers in the service mesh 101 (as indicated by Nginx, MongoDB, MySQL, Redis, etc. in FIG. 1); and data from cloud instances, such as instances from cloud software operation services ("SaaS" in FIG. 1).

In this embodiment, the data mesh 102 can, for example, adopt Kafka system architecture (a high-throughput distributed event streaming system). Kafka is a static building of the mesh. It has been widely used, and thus the detailed description thereof is omitted.

In addition, as shown in FIG. 1, since these data are dynamic in the time dimension, tools such as Cloud Watch (monitoring and management service) and Spot Advisor provided by AWS (Amazon Web Services, a cloud platform provided by Amazon) can be used to obtain data of different time dimensions, for example, bills and outdated data.

The system, according to the present invention, further comprises a multi-layer correlation analysis module connected with the recommendation engine for obtaining dynamics of the data.

In this embodiment, the multi-layer correlation analysis module uses multi-layer correlation and data analytics to analyze data and correlations between different system layers and to identify which parts of the recommendation engine needed to be scaled up in response to increased data volume. The data to be analyzed by the multi-layer correlation analysis module are from multiple layers of the IT infrastructure, including the application, server, and cloud instance layers. The analyzed results are used to build models for, such as system resource demand prediction and resource management to understand the impacts on the system.

The multi-layer correlation is a powerful technique that allows for the analysis of complex systems and interactions therebetween. In data analytics, it is used to make prescriptive recommendations based on the analysis of a large amount of data. According to the present invention, the combination of the multi-layer correlation with data analytics allows for a comprehensive understanding of the system's past, present, and future dynamics, thereby enabling the recommendation engine to make more informed and accurate recommendations. In this embodiment, the multi-layer correlation analysis module analyzes the data and correlations between different layers of the system and which parts of the recommendation engine need to be scaled up can be identified based on the analysis in response to increased data volume while leaving the other portions unchanged. Therefore, the efficiency of the commendation engine is maintained while accurate and personalized recommendations can be provided to users.

The recommendation engine using multi-layer correlation and data analytics according to the present invention can adapt to the predicted, dynamically changing data volumes. To achieve this objective, the system, according to the present invention, further comprises a recommendation module connected with the recommendation engine and the multi-layer correlation analysis module, for making recommendations for optimization based on the analyzed data. Since the recommendation engine can process large volumes of data and identify patterns and trends that would be difficult for a human to discern, it allows the recommendation engine to generate highly accurate and actionable recommendations for optimizing operations and to provide recommendations to users.

In view of the above description, conventional recommendation engines cannot efficiently handle large volumes of data, leading to inefficiencies and waste of resources, and thus resource scaling is needed based on data volume. Hence, the system according to the present invention further comprises an adaptive scaling module, connected with the recommendation engine, for adaptively scaling certain modules of the recommendation engine based on the volume of data being processed.

The adaptive scaling module is able to scale certain, but not all, modules of the recommendation engine based on the volume of data being processed. This allows the recommendation engine to maintain high levels of efficiency and accuracy without wasting resources. When the operation data volume is high, the adaptive scaling module may scale up specific modules of the recommendation engine to handle the increased volume of data. On the contrary, if the data volume decreases, the adaptive scaling module may scale down these modules of the recommendation engine to avoid resource waste. In this way, the present invention provides an adaptive prescriptive analytics system, which can make recommendations more efficient in resource usage without affecting its performance.

According to the present invention, the system can further comprise a user interface, connected with the recommendation engine, for providing recommendations to a user for optimization implementation.

Figure 2:
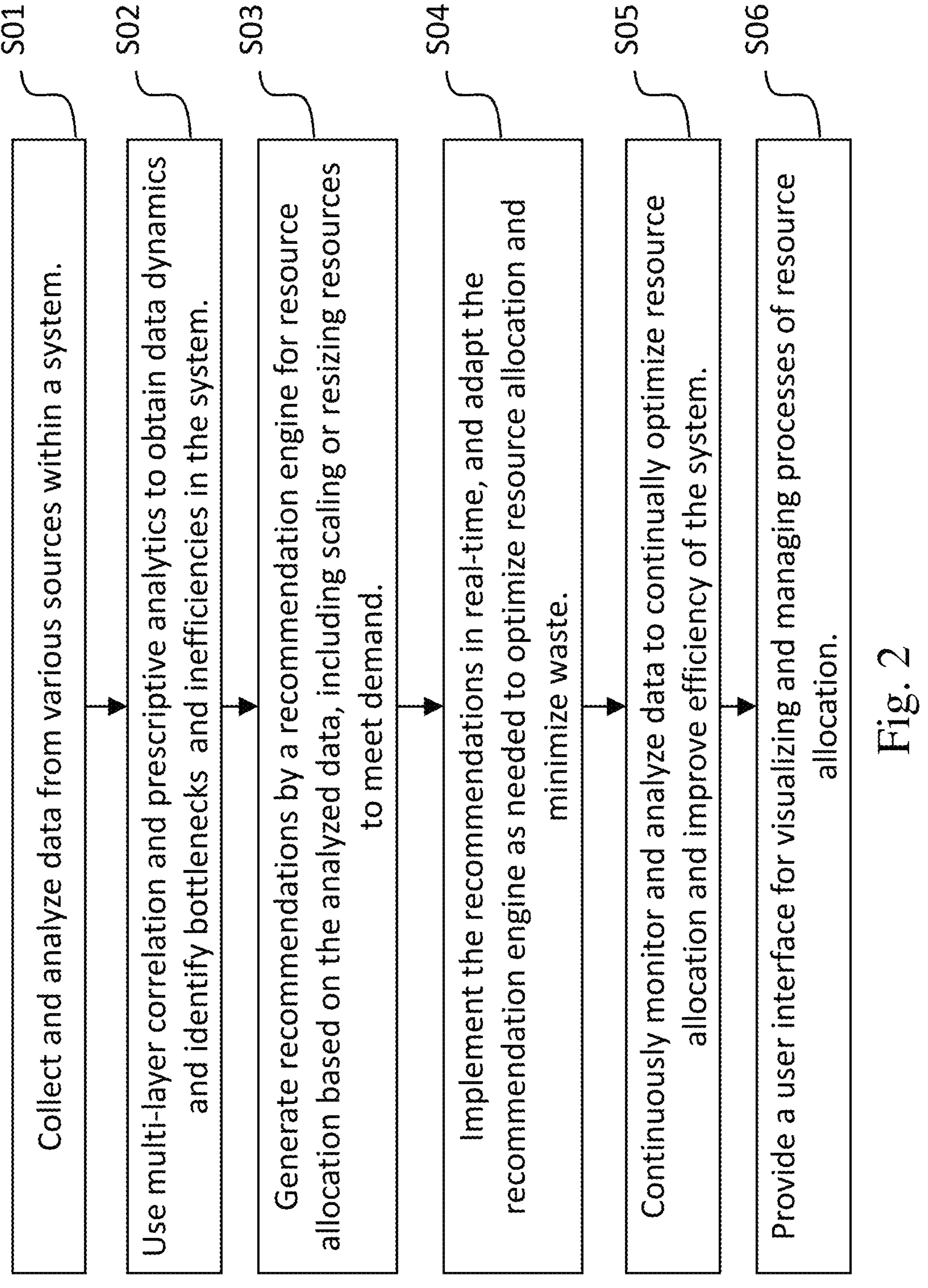
FIG. 2 is a flowchart showing a method according to an embodiment of the present invention.

FIG. 2 is a flowchart showing a method for providing adaptive prescriptive analytics using multi-layer correlation and data analytics according to an embodiment of the present invention. As shown, the method uses the above-mentioned adaptive recommendation engine in the computing system for optimizing resource allocation.

At Step S01, data from various sources within the system, including workload data, resource utilization data, and performance data, are collected and analyzed. The sources include monitoring solutions, service mesh 101, and data mesh 102. Also, the data can be data in different time dimensions, including past and present data.

At Step S02, the multi-layer correlation and the prescriptive analytics are used to obtain data dynamics and identify bottlenecks and inefficiencies in the system. Step S02 can be divided into two sub-steps.

At the first sub-step, resource prediction data at a future time point are obtained based on workload data and resource utilization data through system resource demand prediction and resource management model established by the multi-layer correlation.

For example, suppose the current time point to be T, a past time point T−1, and a future time point T+1. The data obtained at Step S01 include workload data and resource utilization data at time point T−1 and workload data and resource utilization data at time point T. These data are used in a system resource requirement prediction and resource management model. Thus, this model can forecast resource prediction data of time point T+1. Please refer to Applicant's U.S. Pat. No. 11,579,933, in which such a model for system resource demand prediction and resource management established through the multi-layer correlation is disclosed. Therefore, the detailed description thereof is omitted.

At the second sub-step, the bottlenecks and inefficiencies in the system are identified based on the resource prediction data, workload data, resource utilization data and performance data through data dynamics by the prescriptive analytics.

For example, with the aid of multi-layer correlation and prescriptive analytics, it can be predicted which module has a larger amount of data to be operated, and then the module can be scaled up later to meet the demand. On the contrary, it can also be predicted which module has a smaller amount of data to be operated, and then the module can be scaled down to reduce resource waste.

At Step S03, recommendations are generated by a recommendation engine for resource allocation based on the analyzed data, including scaling or resizing resources to meet demand. Namely, when the operation data volume is high, the adaptive scaling module may scale up specific modules of the recommendation engine to handle the increased volume of data. On the contrary, if the data volume decreases, the adaptive scaling module may scale down these modules of the recommendation engine to avoid resource waste.

Figure 3:
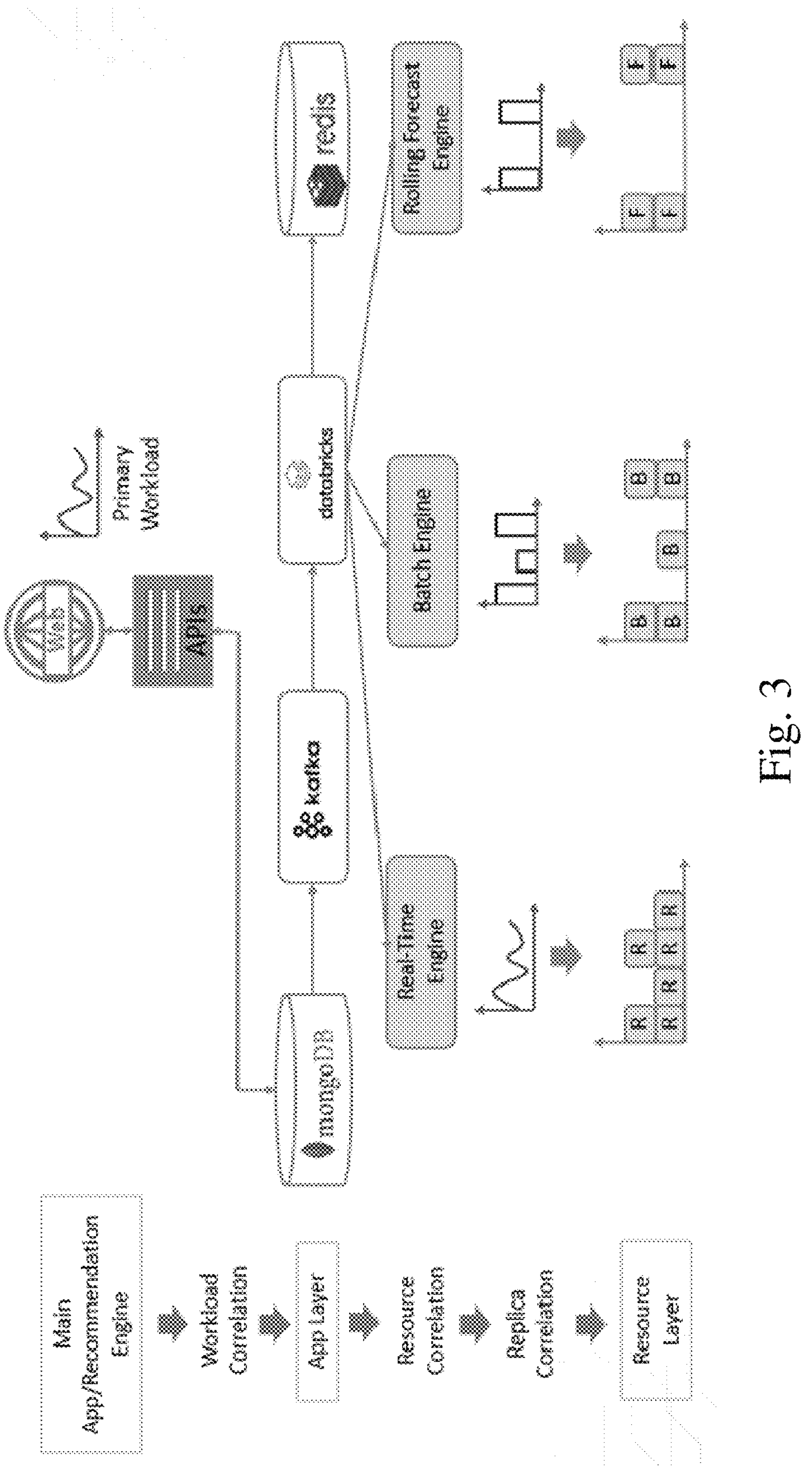
FIG. 3 shows an example of scaling a recommendation engine component based on the volume of data being processed according to the present invention.

FIG. 3 shows an example of scaling a recommendation engine component based on the volume of data being processed according to the present invention. As shown in FIG. 3, an exemplary service provided is Databricks' cloud service, which includes multiple engines, such as real-time engine, batch engine, and rolling forecast engine. Please refer to the primary workload data analysis shown in FIG. 3. When the amount of data in the primary workload changes, the number of components of the corresponding modules allocated by the real-time engine at different time points or segments changes. See the change in the number of blocks R in FIG. 3, where the X-axis indicates the time. At the peak of the primary workload, that is, when the amount of primary workload data is large, the number of allocated components (blocks R) increases. That is, the specified module is scaled up. At the trough of the primary workload, that is, when the amount of primary workload data is small, the number of allocated components (blocks R) is reduced, that is, the specified module is scaled down. In the meantime, the number of components of the corresponding modules allocated by Batch Engine at different time points or segments will also be adjusted based on changes in the primary workload of allocated components. Please refer to blocks B in FIG. 3. When the amount of primary workload data is large, the number of allocated components (blocks B) increases. When the amount of primary workload data is small, the number of allocated components (blocks B) is reduced. This rule applies to rolling forecast engine, too. Please refer to blocks F in FIG. 3.

Entire system is scaled up or down in a traditional recommendation system based on workload demands, resulting in resource waste and increased costs. In contrast, the adaptive recommendation engine according to the present invention uses multi-layer correlation technology and prescriptive analytics to identify and target specific bottlenecks, allowing for selective scaling of specific components rather than the entire system. This results in more efficient resource allocation and cost savings.

Next, at Step S04, the recommendations are implemented in real-time, and the recommendation engine is adapted as needed to optimize resource allocation and minimize waste. In addition, a user is provided with recommendations for implementing optimization at Step S04.

Then, at Step S05, data are continuously monitored and analyzed to continually optimize resource allocation and improve the efficiency of the system;

The adaptive prescriptive analytics method according to the present invention is not directed to a specific time but a continuous optimization method. For example, after multi-layer correlation and prescriptive analytics are performed on the data at time point T+1, the resources are adaptively orchestrated, and then at time point T+2, adaptive resource orchestration should be carried out based on the data situation and prediction results obtained at time point T+1, so that the use of the recommendation engine can be made more efficient and effective through continuous monitoring and analysis. Therefore, the entire system can continuously operate, thereby improving user performance and saving costs.

At Step S06, a user interface is provided for visualizing and managing processes of resource allocation. In addition, recommendations can be overridden or modified as needed by means of the user interface.

FIG. 4 shows a table illustrating the performance advantages of the present invention in comparison with Facebook Prophet (time series forecasting algorithm for Facebook) and LinkedIn Greykite (time series forecasting function for LinkedIn) under the standard Azure 2019 and Alibaba 2021. There are 3446 serverless functions in Azure and 1303 microservices in Alibaba. MAPE represents Mean Average Percentage Error, and it is used for measuring prediction accuracy. As shown in FIG. 4, the engine using the multi-layer correlation and data analytics according to the present invention is much lower than Facebook Prophet and LinkedIn Greykeite in MAPE and runtime. According to the statistics, the cost of application prediction tasks is reduced up to 3.14 times to 22.86 times.

Figure 5A:
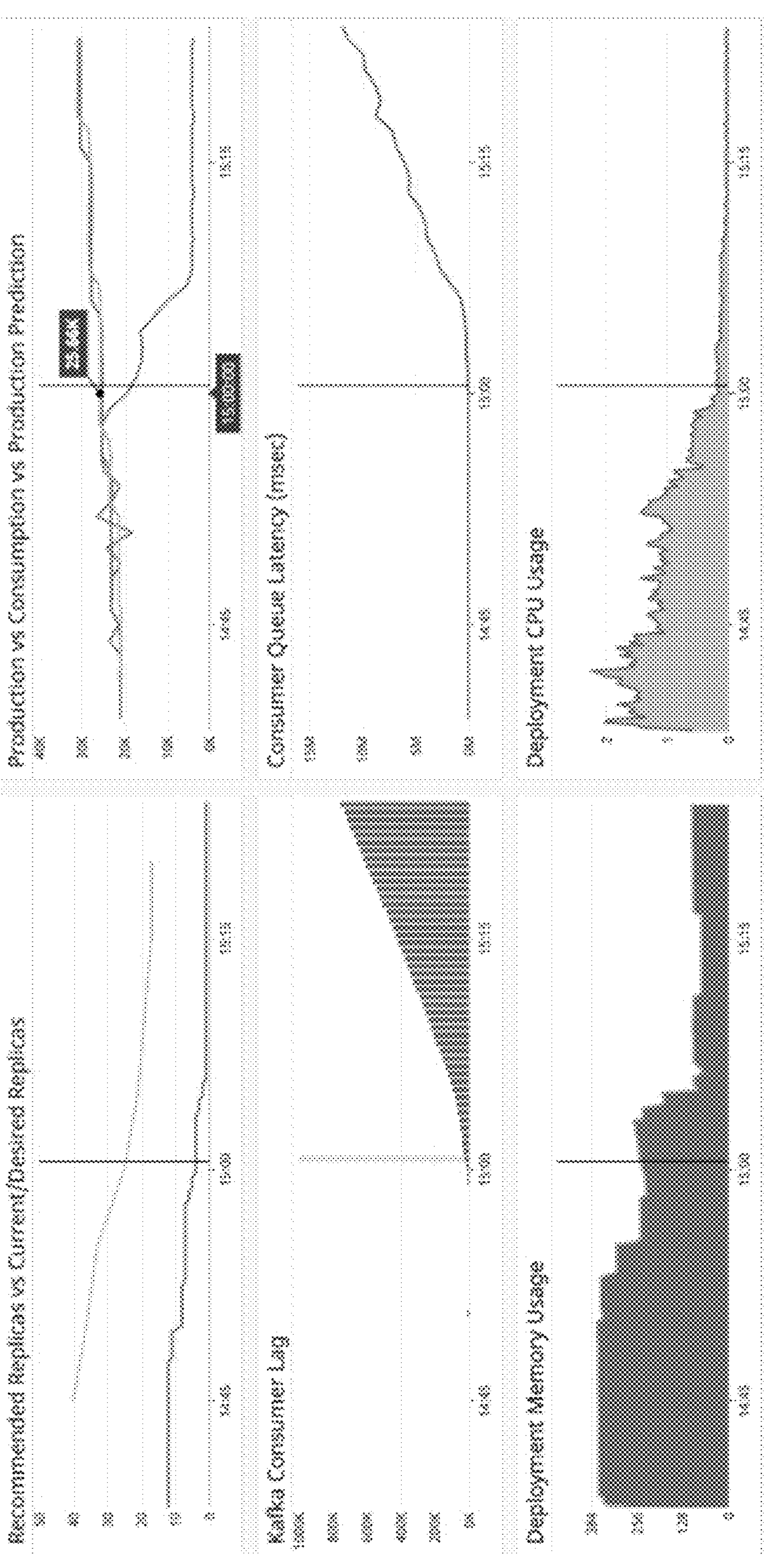
FIG. 5A is a schematic view showing generic HPA with incorrect performance metrics.
Figure 5B:
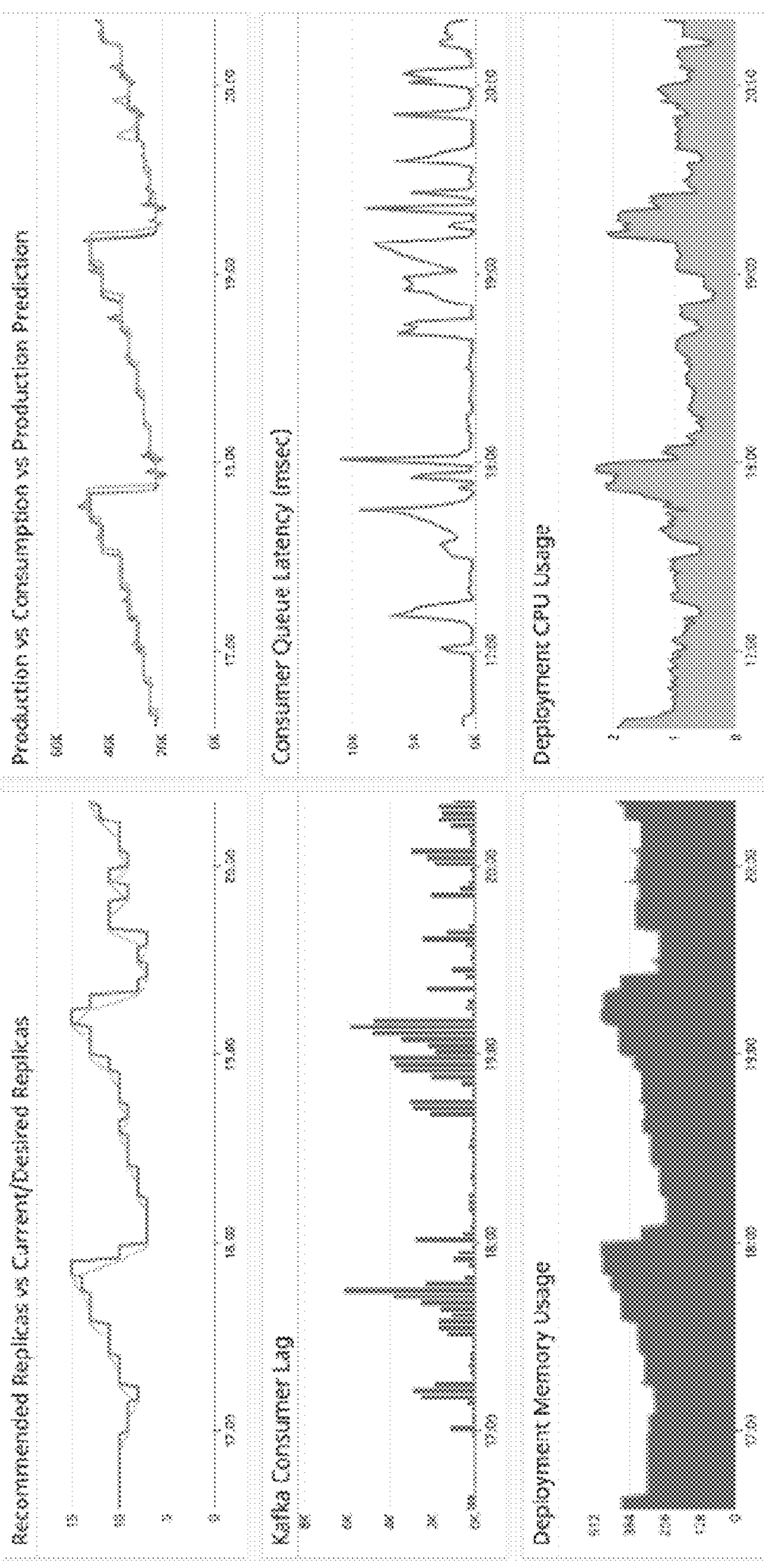
FIG. 5B is a schematic view showing multi-layer correlation with correct performance metrics.

FIG. 5A is a schematic view showing performance metrics for a generic HPA (Horizontal Pod Autoscaler), while FIG. 5B is a schematic view showing performance metrics according to the present invention. As shown in FIG. 5A, due to wrong metrics in the generic HPA controller, various indicators are uneven, such as memory and CPU usage, and there is a high usage rate for a certain period of time. In contrast, the multi-layer correlation and data analytics controller according to the present invention automatically finds correct application metrics for the application HPA, provides accurate predictions with autoscaling at the right time to satisfy application KPI, and prevents the performance metrics from fluctuating dramatically. Compared with the generic HPA, the present invention requires 40% fewer consumer replicas while maintaining a similar performance KPI.

The system and method for providing adaptive prescriptive analytics using multi-layer correlation and data analytics according to the present invention have the following advantages.

Firstly, the adaptive recommendation engine of the present invention utilizes the inventive multi-layer correlation to analyze data from multiple layers of the IT infrastructure, while conventional recommendation engines generally focus on analyzing data at a single layer.

Secondly, the adaptive recommendation engine of the present invention utilizes prescriptive analytics to make intelligent recommendations for resource allocation, while the prior arts generally focus on making recommendations based on past data and user behavior rather than adapting to changing data volumes in real-time.

Thirdly, the adaptive recommendation engine of the present invention is designed to optimize resource allocation and reduce waste, while the prior arts generally focus on improving recommendation accuracy rather than resource optimization.

While the invention has been described in terms of what is presently considered to be the most practical and preferred embodiments, it is obvious the modules mentioned herein can be integrated into one module or divided into more sub-modules and thus, it is to be understood that the invention needs not to be limited to the disclosed embodiments. On the contrary, it is intended to cover various modifications and similar arrangements included within the spirit and scope of the appended claims, which are to be accorded with the broadest interpretation to encompass all such modifications and similar structures.

What is claimed is:

1. A system for providing adaptive prescriptive analytics using multi-layer correlation and data analytics, comprising:

a recommendation engine implemented as a plurality of microservices including at least a real time analytics engine, a batch analytics engine, and a forecast analytics engine;

a telemetry interface configured to collect application-layer performance metrics, service-mesh traffic metrics, and infrastructure-layer resource utilization metrics;

a multi-layer correlation controller, connected with said recommendation engine, configured to execute one or more correlation models that map the collected metrics across the application layer, service-mesh layer, and infrastructure layer to identify a workload bottleneck associated with a specific one of the microservices;

a memory, connected with said recommendation engine and said multi-layer correlation controller, configured to store data and instructions for generating optimization recommendations based on the mapped metrics; and an adaptive scaling controller, connected with said recommendation engine, configured to automatically issue scaling commands to a container orchestration platform to selectively adjust a replica count or compute resources of only the specific microservice associated with the identified workload bottleneck while maintaining other microservices unchanged.

2. The system according to claim 1, wherein said multi-layer correlation controller is configured to analyze correlations between metrics from different system layers to determine which microservice requires scaling in response to increased data volume.

3. The system according to claim 1, wherein the collected metrics comprise application data, server data, and cloud instance data.

4. The system according to claim 1, further comprising a user interface connected with said recommendation engine and configured to present the optimization recommendations to a user.

5. A computer implemented method for providing adaptive prescriptive analytics using multi-layer correlation and data analytics, comprising:

a) collecting runtime telemetry including application key performance indicators (KPIs), service-mesh metrics, and infrastructure resource metrics;

b) executing one or more multi-layer correlation models to map the collected telemetry across multiple system layers and identify a workload bottleneck corresponding to a specific analytics engine;

c) automatically generating scaling instructions targeted to the identified analytics engine based on the identified workload bottleneck;

d) applying the scaling instructions via a container orchestration system to modify compute resources of the identified specific analytics engine without scaling other engines.

6. The method according to claim 5, wherein step b) comprises:

b1) generating resource prediction data for a future time point based on workload data and resource utilization data using a resource demand prediction model; and b2) identifying bottlenecks and inefficiencies in the system based on the resource prediction data, workload data, resource utilization data, and performance data.

7. The method according to claim 5, further comprising providing the generated optimization recommendations to a user.

8. The method according to claim 7, further comprising enabling the user to override or modify the optimization recommendations via a user interface.

* * * * *